United States Patent
Nannapaneni et al.

(10) Patent No.: US 12,436,832 B2
(45) Date of Patent: Oct. 7, 2025

(54) CONTEXTUAL NAVIGATION FOR ERRORS AND WARNINGS

(71) Applicant: SAP SE, Walldorf (DE)

(72) Inventors: Kalyan Chakravarthy Nannapaneni, Bangalore (IN); Anoochan Pandey, Bangalore (IN); Sampathkumar S, Bangalore (IN); Sushant Taneja, Bangalore (IN); Srinivas S, Bangalore (IN); Anagha S Gadagkar, Bangalore (IN); Ajay Krishna Uniyal, Bangalore (IN)

(73) Assignee: SAP SE, Walldorf (DE)

( * ) Notice: Subject to any disclaimer, the term of this patent is extended or adjusted under 35 U.S.C. 154(b) by 93 days.

(21) Appl. No.: 18/523,694

(22) Filed: Nov. 29, 2023

(65) Prior Publication Data

US 2025/0173207 A1   May 29, 2025

(51) Int. Cl.
  *G06F 16/00*   (2019.01)
  *G06F 9/451*   (2018.01)
  *G06F 11/07*   (2006.01)

(52) U.S. Cl.
  CPC .......... *G06F 11/0766* (2013.01); *G06F 9/451* (2018.02)

(58) Field of Classification Search
  None
  See application file for complete search history.

(56) References Cited

U.S. PATENT DOCUMENTS

| | | | | |
|---|---|---|---|---|
| 7,167,893 | B1* | 1/2007 | Malone | G06F 16/20 |
| | | | | 707/999.102 |
| 9,864,679 | B2* | 1/2018 | Brealey | G06F 11/3692 |
| 9,928,162 | B2* | 3/2018 | Brealey | G06F 11/3692 |
| 10,140,170 | B2* | 11/2018 | Damron | G06F 9/45558 |
| 10,503,627 | B2* | 12/2019 | Radhakrishnan | G06F 11/3438 |
| 11,024,406 | B2* | 6/2021 | Sadeghi | G06Q 10/10 |
| 11,132,279 | B2* | 9/2021 | Radhakrishnan | G06F 11/0787 |
| 2002/0126812 | A1* | 9/2002 | Majewski | H04M 15/70 |
| | | | | 379/114.03 |
| 2002/0129022 | A1* | 9/2002 | Majewski | G06F 16/25 |
| 2002/0129039 | A1* | 9/2002 | Majewski | H04M 15/70 |
| 2012/0204068 | A1* | 8/2012 | Ye | G06F 11/0769 |
| | | | | 714/57 |
| 2012/0278194 | A1* | 11/2012 | Dewan | G06F 11/0784 |
| | | | | 705/347 |

(Continued)

*Primary Examiner* — Jean M Corrielus
(74) *Attorney, Agent, or Firm* — Fountainhead Law Group, PC (57) ABSTRACT

To provide contextual navigation for errors and warnings, first a selection is obtained, via a user interface, of a node within a hierarchy of nodes for a report. Then error information and a preview of report information corresponding to the selection are obtained. The preview includes a plurality of fields and values. The error information includes error indications for erroneous values in the portion of the report. The preview of the report information is presented in the user interface and error indications are included in the preview. If a selection of a particular error indication is obtained then the particular node containing that erroneous value is navigated to and the report information corresponding to the particular node is retrieved. Then the report information is presented in the user interface along with an identifier of the particular erroneous value.

20 Claims, 8 Drawing Sheets

(56) References Cited

U.S. PATENT DOCUMENTS

| | | | | |
|---|---|---|---|---|
| 2012/0303669 | A1* | 11/2012 | Chmiel | G06Q 30/02 |
| | | | | 707/E17.012 |
| 2014/0040806 | A1* | 2/2014 | Anderson | G06F 40/177 |
| | | | | 715/771 |
| 2014/0229773 | A1* | 8/2014 | Ye | G06F 11/079 |
| | | | | 714/57 |
| 2014/0278448 | A1* | 9/2014 | Sadeghi | G06Q 10/10 |
| | | | | 705/2 |
| 2015/0220380 | A1* | 8/2015 | Ahrens | G06F 11/0769 |
| | | | | 714/57 |
| 2016/0283344 | A1* | 9/2016 | Brealey | G06F 11/3692 |
| 2016/0283365 | A1* | 9/2016 | Brealey | G06F 11/3692 |
| 2017/0116067 | A1* | 4/2017 | Damron | H04L 43/0823 |
| 2017/0116068 | A1* | 4/2017 | Damron | H04L 43/04 |
| 2017/0270089 | A1* | 9/2017 | Anderson | G06F 40/177 |
| 2019/0026177 | A1* | 1/2019 | Damron | G06F 11/0778 |
| 2019/0034253 | A1* | 1/2019 | Vedurumudi | G06F 11/0709 |
| 2019/0129824 | A1* | 5/2019 | Radhakrishnan | G06F 11/0766 |
| 2020/0065223 | A1* | 2/2020 | Radhakrishnan | G06F 11/3698 |
| 2021/0398630 | A1* | 12/2021 | Sadeghi | G06Q 10/10 |
| 2022/0022020 | A1* | 1/2022 | Kanno | H04W 4/029 |
| 2022/0036669 | A1* | 2/2022 | Brace | G07C 5/0816 |
| 2022/0283761 | A1* | 9/2022 | Shrestha | G06F 3/1292 |
| 2023/0409468 | A1* | 12/2023 | Gonzalez Sanchez | |
| | | | | G06F 11/302 |

* cited by examiner

CONTEXTUAL NAVIGATION FOR ERRORS AND WARNINGS

BACKGROUND

The present disclosure relates to software user interfaces and in particular to navigation within the user interface for viewing errors and warnings.

Certain software applications are configured to generate reports that are used to comply with reporting obligations (e.g., statutory reporting). For example, there are reports with large and complex data that need to be processed and presented to relevant tax authorities in an expected output format, such as XML, XBRL, JSON, etc. Such technical formats could contain a large set of data and may be complex in structure. Generally, the technical formats are formatted as a hierarchy having various sections and subsections.

In some situations a user would like to view content of various generated technical formats along with any errors or warnings detected for that content. Furthermore, users may also review for errors and revise the report information before submitting it to the authorities requesting that report. For example, during report generation certain generated values may be either empty or they may have type validation issues. These errors and warnings are captured in a message log and may be shown to the user. However, since the technical formats can contain large sets of data and are complex in structure, it may be difficult for the user to view the corresponding portions of the report information. To help the user view and correct reports efficiently, the report may be displayed in hierarchy-based structure and each node of the hierarchy may be selectable. For example, users may select each node of the hierarchy to view the corresponding report information in various sections and sub sections of the user interface.

However, even with hierarchical navigation of the report in the user interface it may be a time consuming process the finding the source of the error or warning in the report as the errors and warnings may be at nested levels of the hierarchy, there may be many numbers of logs that get generated, and the user may need to deep dive into each section and subsection to identify the errors using the generated log. For these reasons and others, it is inefficient and time consuming to review errors and warnings in large and complex report documents using prior software application user interfaces.

The present disclosure addresses these issue and others, as further described below.

SUMMARY

Some embodiments provide a computer system comprising one or more processors and one or more machine-readable medium coupled to the one or more processors. The machine-readable medium storing computer program code comprising sets of instructions executable by the one or more processors. The instructions executable to obtain a selection of a node within a hierarchy of nodes for a report via a user interface of a reporting application, the hierarchy corresponding to a hierarchical data structure of a data file containing report information for the report. The instructions further executable to obtain error information and at least a preview of report information for a portion of the report corresponding to the selection, the preview of the report information including a plurality of fields and a plurality of values in the portion of the report, the error information including one or more error indications for erroneous values of the plurality of values in the portion of the report. The instructions further executable to present, in the user interface, the preview of the report information, and one or more error indications for the erroneous values that are included in the preview. The instructions further executable to obtain a selection of a particular error indication of the one of more error indications, the particular error indication for a particular erroneous value in the preview. The instructions further executable to navigate to a particular node within the hierarchy containing the particular erroneous value. The instructions further executable to retrieve the report information corresponding to the particular node. And the instructions further executable to present, in the user interface, the report information corresponding to the particular node along with an identifier of the particular erroneous value.

Some embodiments provide one or more non-transitory computer-readable medium storing computer program code comprising sets of instructions. The computer program code comprising sets of instructions to obtain a selection of a node within a hierarchy of nodes for a report via a user interface of a reporting application, the hierarchy corresponding to a hierarchical data structure of a data file containing report information for the report. The computer program code further comprising sets of instructions to obtain error information and at least a preview of report information for a portion of the report corresponding to the selection, the preview of the report information including a plurality of fields and a plurality of values in the portion of the report, the error information including one or more error indications for erroneous values of the plurality of values in the portion of the report. The computer program code further comprising sets of instructions to present, in the user interface, the preview of the report information, and one or more error indications for the erroneous values that are included in the preview. The computer program code further comprising sets of instructions to obtain a selection of a particular error indication of the one of more error indications, the particular error indication for a particular erroneous value in the preview. The computer program code further comprising sets of instructions to navigate to a particular node within the hierarchy containing the particular erroneous value. The computer program code further comprising sets of instructions to retrieve the report information corresponding to the particular node. The computer program code further comprising sets of instructions to present, in the user interface, the report information corresponding to the particular node along with an identifier of the particular erroneous value.

Some embodiments provide a computer-implemented method. The method comprises obtaining a selection of a node within a hierarchy of nodes for a report via a user interface of a reporting application, the hierarchy corresponding to a hierarchical data structure of a data file containing report information for the report. The method further comprises obtaining error information and at least a preview of report information for a portion of the report corresponding to the selection, the preview of the report information including a plurality of fields and a plurality of values in the portion of the report, the error information including one or more error indications for erroneous values of the plurality of values in the portion of the report. The method further comprises presenting, in the user interface, the preview of the report information, and one or more error indications for the erroneous values that are included in the preview. The method further comprises obtaining a selection of a particular error indication of the one of more error indications, the particular error indication for a particular erroneous value in the preview. The method further comprises navigating to a particular node within the hierarchy containing the particular erroneous value. The method further comprises retrieving the report information corresponding to the particular node. The method further comprises presenting, in the user interface, the report information corresponding to the particular node along with an identifier of the particular erroneous value.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," etc., do not necessarily indicate an ordering or sequence unless indicated and may instead be used for differentiation between different objects or elements.

As mentioned above, in some situations a user would like to view content of various generated technical formats along with any errors or warnings detected for that content. Furthermore, users may also review for errors and revise the report information before submitting it to the authorities requesting that report. For example, during report generation certain generated values may be either empty or they may have type validation issues. These errors and warnings are captured in a message log and may be shown to the user. However, since the technical formats can contain large sets of data and are complex in structure, it may be difficult for the user to view the corresponding portions of the report information. To help the user view and correct reports efficiently, the report may be displayed in hierarchy-based structure and each node of the hierarchy may be selectable. For example, users may select each node of the hierarchy to view the corresponding report information in various sections and sub sections of the user interface.

However, even with hierarchical navigation of the report in the user interface it may be a time consuming process the finding the source of the error or warning in the report as the errors and warnings may be at nested levels of the hierarchy, there may be many numbers of logs that get generated, and the user may need to deep dive into each section and subsection to identify the errors using the generated log. For these reasons and others, it is inefficient and time consuming to review errors and warnings in large and complex report documents using prior software application user interfaces.

The address these issues, and others, the present disclosure provides techniques to perform contextual navigation for errors and warnings.

Figure 1:
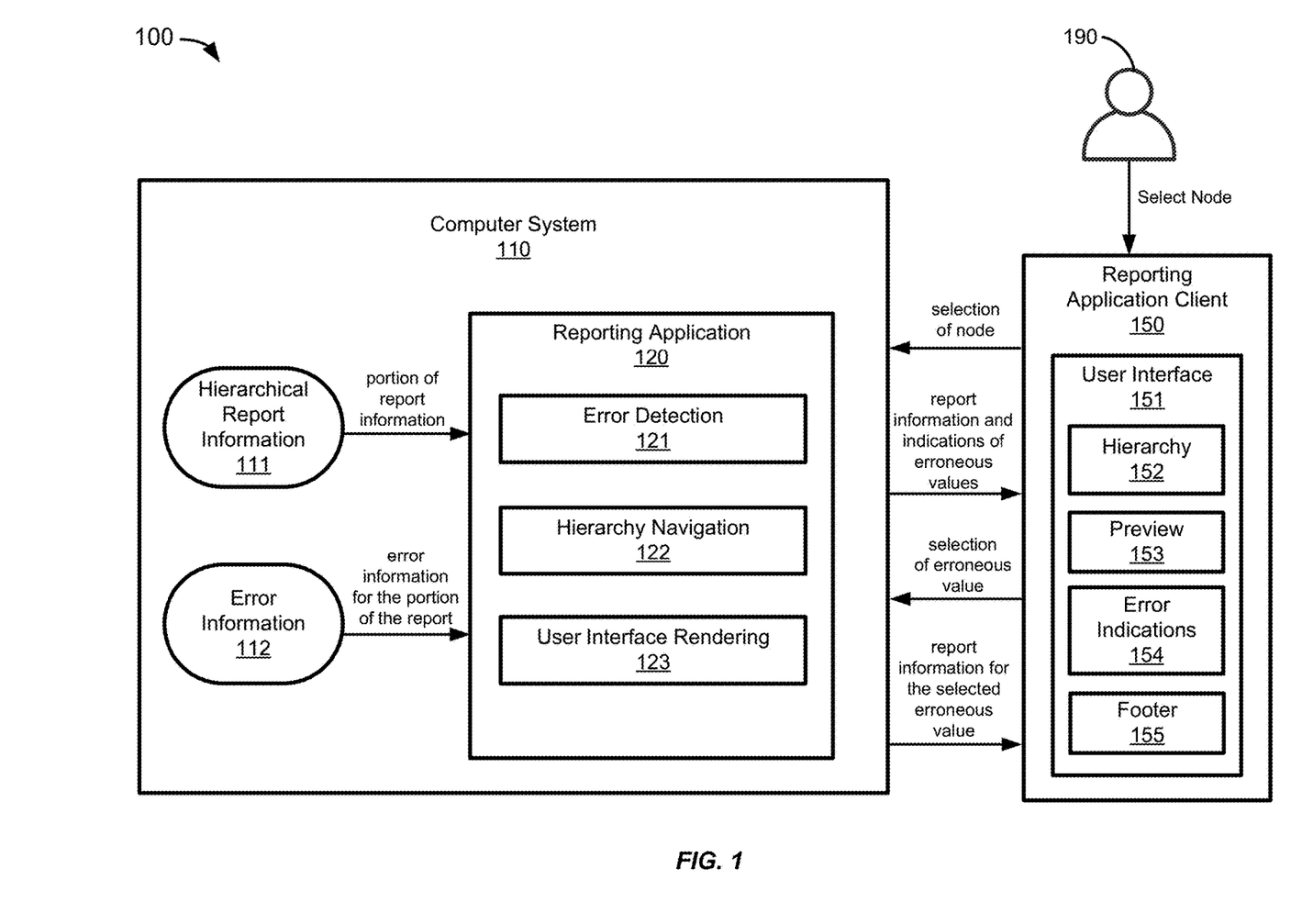
FIG. 1 shows a diagram of a computer system providing contextual navigation of report information and error information, according to an embodiment.

FIG. 1 shows a diagram 100 of a computer system providing contextual navigation of report information and error information, according to an embodiment. The computer system 110 may include one or more computer servers operating together as a system. The computer system 110 may be implemented using computer hardware including one or more one or more processors and one or more machine-readable medium coupled to the one or more processors. The machine-readable medium storing computer program code comprising sets of instructions executable by the one or more processors to perform the functions and operations described below.

The computer system 110 provides a reporting application 120 backend that is accessible by a reporting application client 150 used by a user 190. The reporting application 120 includes software components for providing hierarchical reporting information 111 and error information 112 to the reporting application client 150 according to selections may by the user 190 as well as other filters and configurations.

Figure 5:
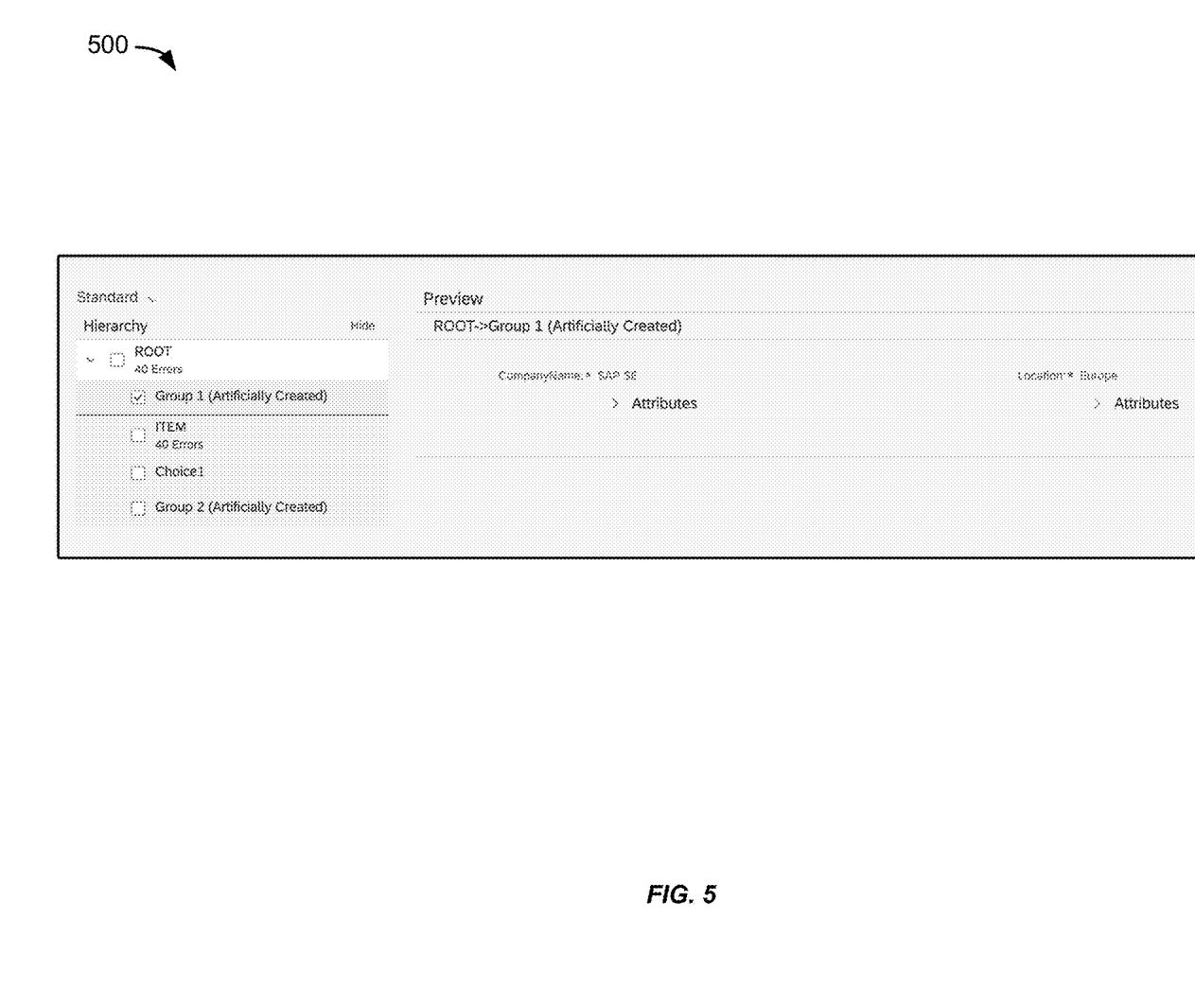
FIG. 5 illustrates a user interface showing a hierarchy and a preview, according to an embodiment.
Figure 6:
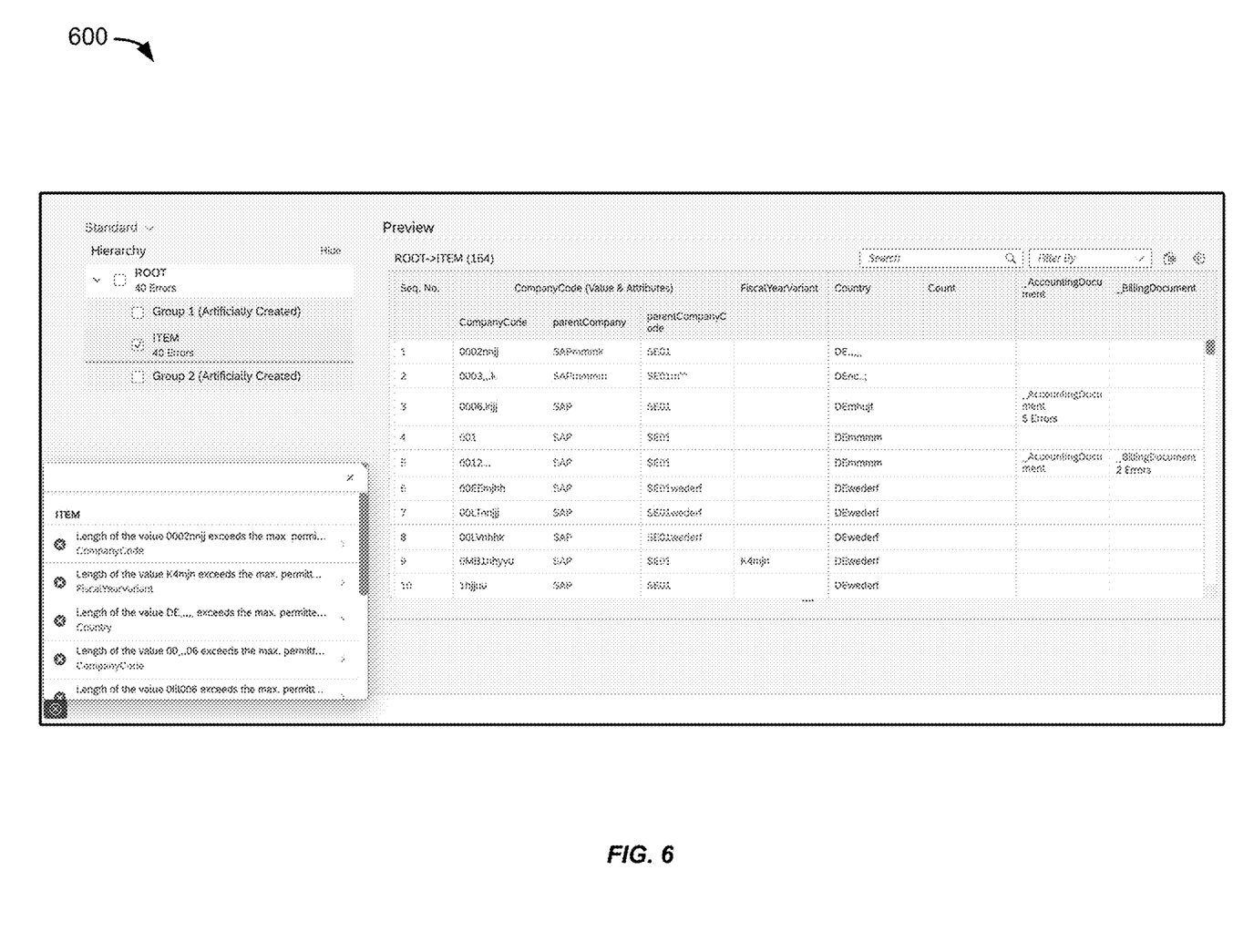
FIG. 6 illustrates a user interface showing indications of erroneous values in a preview along with a footer having a list of errors, according to an embodiment.
Figure 7:
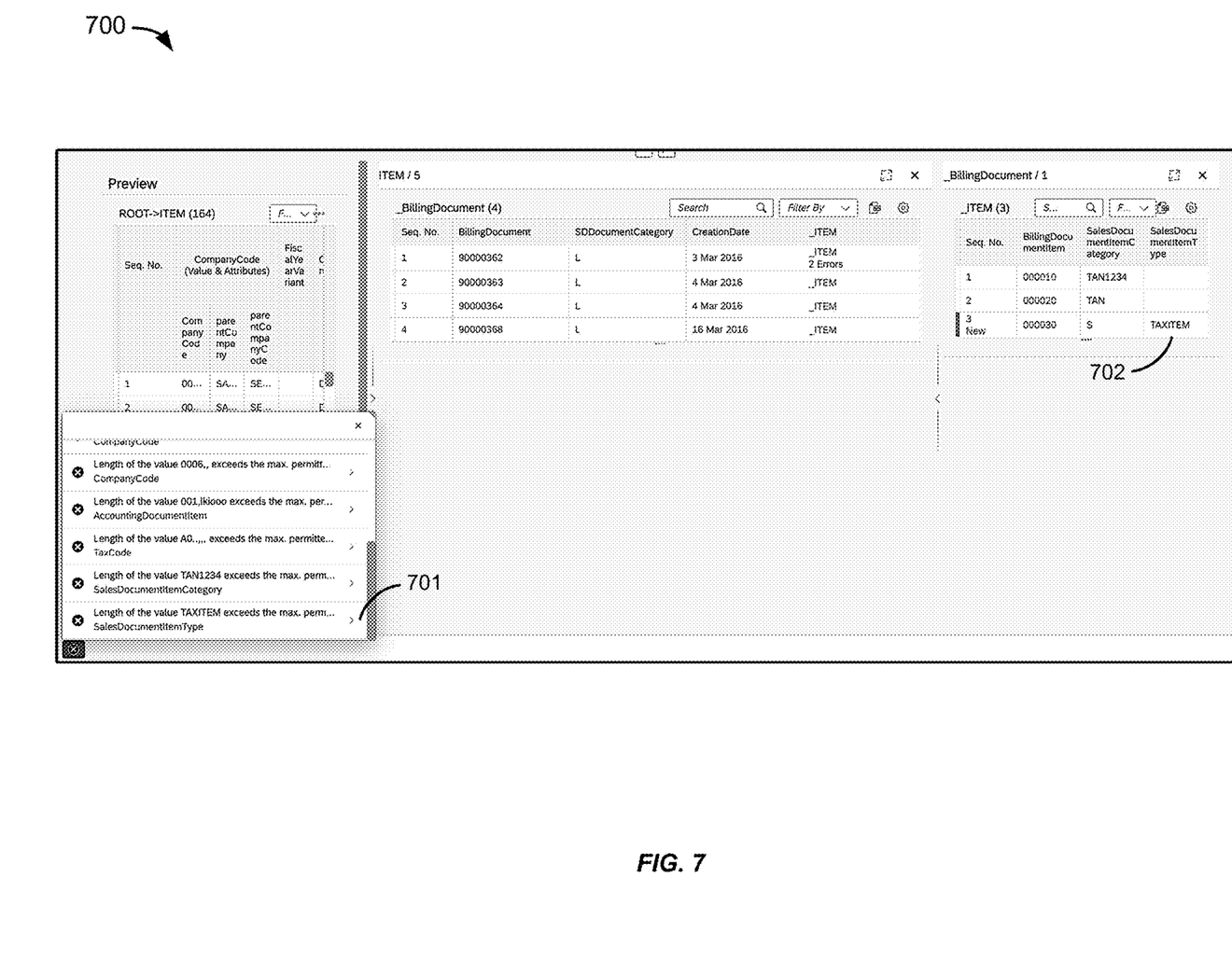
FIG. 7 illustrates a user interface showing a preview of a report information having an erroneous value and an indication of the erroneous value, according to an embodiments.

The reporting application client 150 include software components for presenting a user interface 151, which includes a hierarchy 152 selection menu and a data preview 153 area of the user interface presenting tables, fields, and values of the report information 111 and any corresponding error information 112. The user interface 151 also includes errors indications 154 presented along with the data preview 153. An examples of the hierarchy 152 and data preview are shown in FIG. 5, FIG. 6, and FIG. 7. Examples of the errors indications 154 are shown in FIG. 6 and FIG. 7.

The reporting application client 150 is used by the user 190 to view reports using the user interface 151. These reports may be large and complex reports, as mentioned above. In some embodiments the reports may be used by the user 190 to meet reporting obligations (e.g., statutory reporting obligations). The reporting information 111 used to generate the reports may be stored in the database system, for example. The reporting information 111 is hierarchical and may be formatted according to a tree model, for example. Each node in the hierarchy may have zero or more children, for example. In some embodiments the hierarchical data may be stored in a database with parent child relationship.

The hierarchical report information 1111 may be stored in a technical format, as mentioned above. As used herein, the terms "technical format" and "technical file" respectively refer to file formats or files themselves that are designed to be used for storing data to be processed before being presented to an end user in a user interface. That is, the technical format is not designed to be directly inspected by a typical end user, even if the underlying data is designed to be more easily inspected and reviewed by a technical user or programmer (e.g., the file uses markdown). For instance, XML files are referred to as a "technical format" and XML files are referred to ask "technical files" because while they use markdown to be more easily inspected by and coded by computer programmers and software engineers, such files are designed to be parsed and processed before the information is presented to an end user via a user interface.

The user interface 151 presents a hierarchy 152, which includes selection menu for selecting nodes of the hierarchy 152 (e.g., options for selecting a root node of the hierarchy, each section of the hierarchy, and each subsection of the hierarchy). Examples of selections of nodes in the hierarchy are shown in FIG. 5 and FIG. 6.

When user wants to view the report information, they may use the user interface 151 to perform selection of a particular node within the hierarchy 152. The report information 111 is then displayed in a hierarchy-based structure and when the information is loaded the user interface 151 of the application client 150, the user interface 151 also displays error and warning counts at the node level. The errors and warnings are also shown in a footer 155 within the user interface. Where each node on the hierarchy will display errors of its children and footer will show all the error/warnings of the document.

The report information may be shown in a preview area on the right side of the user interface 151 as shown in FIG. 5, FIG. 6, and FIG. 7. While displaying data on the right side of hierarchy-based structure, the fields which are generated and rendered with errors and warnings that are indicated. For example, indications of errors and warnings may include highlighted or colored text, such as red coloration for errors and orange coloration for warnings. This may enable the user to visually identify the errors and warnings. Furthermore, on hover of such fields (via the user interface) all errors and warnings messages of that field will be displayed as a tool tip.

The computer system 110 may also provide an option for the user 190 to apply filters on tables in the preview screen so that user can decide to view only errors, warnings and manually adjusted fields. This will enable user to react faster on the erroneous data in generated file. FIG. 6 shows an example user interface with an input field labeled "Filter By" where the user 190 may input filters to be applied on the tables in the preview area.

The reporting application 120 and the reporting application client 150 also enable the user 190 to be able to edit and modify the values of the report information 111. For example, the user 190 may enter empty values and type validation errors values to be saved, as there may be instances where these values are valid for the user's particular use case. Whether the errors and warnings were intended or not, such errors and warning values are detected and displayed to the user in both the hierarchy 152 and the screen footer 155. When user modifies or corrects values that had errors or warnings in the user interface 151, the error/warning count (add/subtract) will be updated in the hierarchy and an error/warning list or message in the footer 155 is also updated (add/remove) immediately. The detection of errors and warnings, and counting of errors and warnings, is performed by an error detection 121 software component of the reporting application 120.

From preview area 153 and footer 155, the user 190 can view all errors/warnings of the document. These messages may be grouped by fields, so that if a field has more than one error/warning, the user 190 can see all the messages and act upon the errors/warnings. If errors/warnings are repetitive for the same field but different sequence number (errors/warnings on a column level for all rows) only one entry may be shown in the footer log so that log will not be repetitive.

The reporting application 120 also provides contextual navigation for errors and warnings. For example, when the user 190 clicks on (or otherwise selects) an error message/indication, the computer system 110 is configured to navigate the hierarchy, recursively traversing from the child node containing the error up to its parent, and its parents, and so on, to set focus in the user interface 151 to the corresponding field. For instance, when the user 190 selects a message in the footer 155 of the screen, the hierarchy navigation 122 software component of the reporting application 120 calculates the position of field (e.g., based on a schema given by the authorities) in the user interface 151 and a page in the user interface is scrolled or otherwise navigated to that specific section and focus is set to that field. This way user 190 can have a context-based navigation for all errors/warnings. For repetitive errors/warnings system will set filters to the table so that all similar errors/warnings can be seen at once.

An example of contextual navigation is now provided. First, the user may select a particular report in the reporting application 120. Then the user may perform selection of a particular node within the hierarchy of nodes for a report via the user interface 151 of a reporting application 150. This selection is obtained by the reporting application 120 of the computer system 110. The hierarchy 152 presented in the user interface 151 corresponds to a hierarchical data structure of a data file containing report information for the report (i.e., hierarchical report information 111). FIG. 5 shows an example user interface in which the root node contains children "Group 1," "ITEM," "Choice1," and "Group 2," where "Group 1" is selected. FIG. 5 shows an example user interface in which "ITEM" is selected.

The reporting application 120 obtains the selection and, in response, obtain error information 112 and at least a preview 153 of report information 111 for a portion of the report corresponding to the selection. The preview 153 of the report information includes a plurality of fields and a plurality of values in the portion of the report. The error information includes one or more error indications 154 for erroneous values of the plurality of values in the portion of the report. For example, if "ITEM" is selected as shown in FIG. 6, then the portion of the report may include report information for children of the "ITEM" node.

The user interface rendering component 123 is configured to render and then present, in the user interface 151, the preview 153 of the report information 111, and one or more error indications 154 for the erroneous values that are included in the preview 153. FIG. 6 shows several error indications. For example, the hierarchy section on the left side includes an error indication that states "40 errors," the "_AccoutingDocument" column in the preview on the right side includes an error indication that states "5 errors," and the footer includes a list of errors and error indications such as "Length of the value 002nnii exceeds the max. permi . . . " and others.

The user 190 may select one of these error indications to navigate, based on that context, to the child node within the hierarchy corresponding to that error. To do this, the computer system 110 obtains a selection of a particular error indication of the one of more error indications, where the particular error indication for a particular erroneous value in the preview 153. For example, if the user may select an error indication stating "Length of the value TAXITEM exceeds the max. perm . . . " in the footer as shown in FIG. 7 and then the hierarchy navigation 112 component of the computer system 110 may navigate to the corresponding SalesDocumentItemType node (e.g., "_BillingDocument") containing that node and the error, and the user interface rendering 123 component may retrieve the corresponding report information 111 and error information 112 and render them in the user interface 151, as shown in FIG. 7. That is, the hierarchy navigation 112 component navigates to a particular node within the hierarchy containing the particular erroneous value and retrieves the report information corresponding to the particular node. The user interface rendering 123 component renders and presents, in the user interface 151, the report information 111 corresponding to the particular node along with an identifier of the particular erroneous value.

In the example of FIG. 7, the value "TAXITEM" for sequence number 3 (Seq. No. 3) has this error and the table and fields of the corresponding _ITEM node are rendered in the preview area of the user interface, in response to the user's selection of the error indication in the footer.

In some embodiments the error information presented in the user interface 151 may further includes an error count for the values in the portion of the report. The error count may determine the error detection 121 component by counting errors and warnings generated for erroneous values in the portion of the report. In such embodiments, the reporting application 120 user interface rendering 123 component may present, in the user interface 151, the error count along with the preview 153 of the report information.

In some embodiments, the reporting application 120 may receive user input via the user interface, where the user input modifies a value of a particular field to a modified value. In such cases, the error detection 121 component may determine error information for the particular field having the modified value and then update the error count to an updated error count based on the error information for the particular field. Then the user interface rendering 123 component may present the updated error count in the user interface 151. The user interface 151 may also include an indication that the modified value has been modified by the user input. For example, blue coloration may be used for modified text while red coloration may be used for errors.

As mentioned above, in some embodiments, the reporting application may present a footer in the user interface. The footer may contain a list of the erroneous values where each erroneous value of the list in the footer is configured to be selectable by a user to navigate within the user interface to the corresponding node within the hierarchy.

Features and advantages of the contextual navigation for errors and warnings described herein include an improved user experience whereby manual search of fields may be fully or partially eliminated. Additional advantages are that the user can view errors/warnings easily,
resolve the errors/warnings quicker, load specific errors/warnings field on click of log message in footer, view all messages for a field in a grouped manner, and apply filters to view only errors, warnings, and/or manually adjusted values. Thus, much of the manual effort in tracking down errors and warnings in large and complex reports is eliminated by the techniques described herein.

Figure 2:
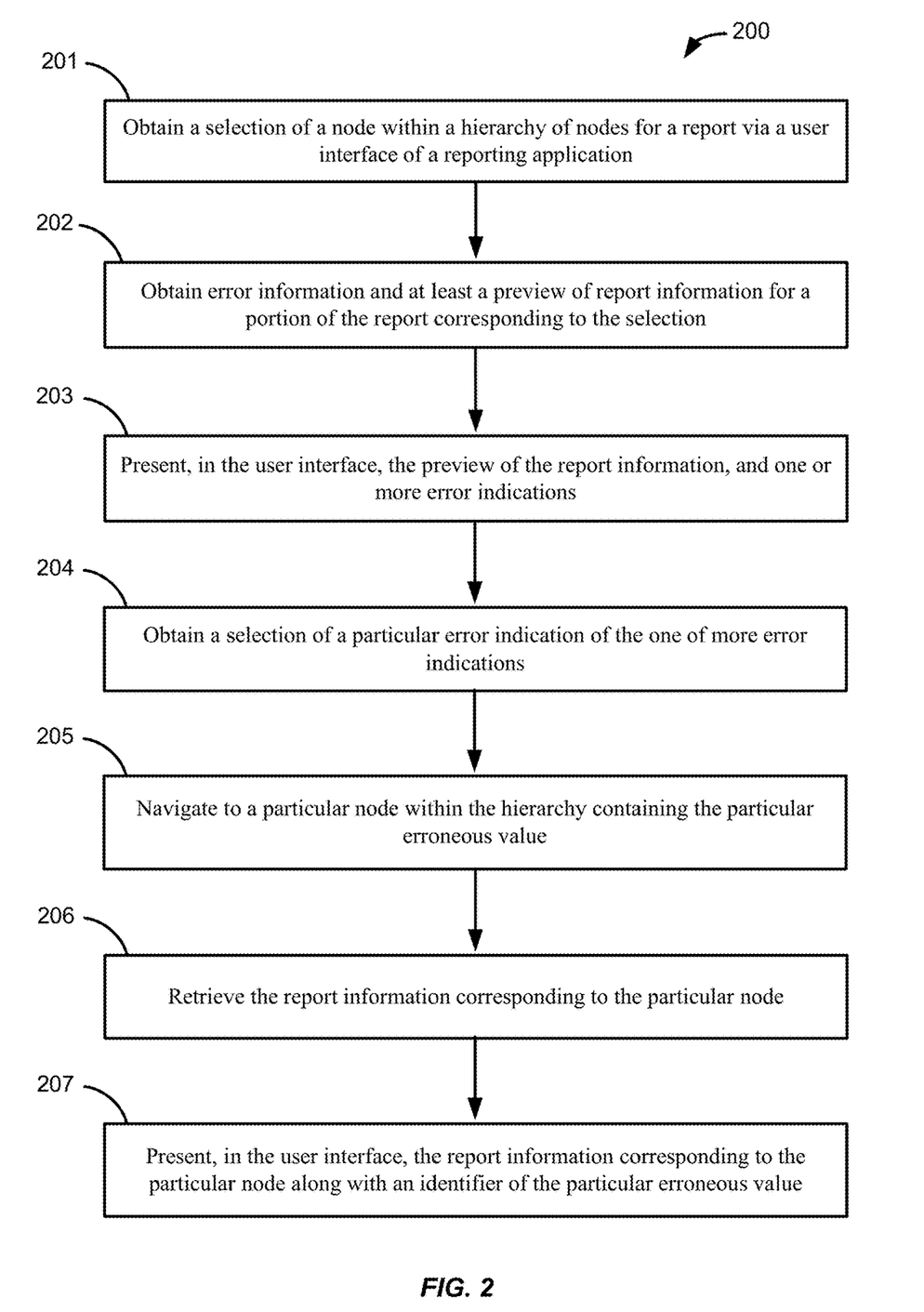
FIG. 2 shows a flowchart of a computer implemented method for contextual navigation of errors and warnings, according to an embodiment.

FIG. 2 shows a flowchart 200 of a computer implemented method for contextual navigation of errors and warnings, according to an embodiment. This computer implemented method may be implemented by a computer system, such as the computer system 110 described above with respect to FIG. 1.

At 201, obtain a selection of a node within a hierarchy of nodes for a report via a user interface of a reporting application, the hierarchy corresponding to a hierarchical data structure of a data file containing report information for the report.

At 202, obtain error information and at least a preview of report information for a portion of the report corresponding to the selection. The preview of the report information including a plurality of fields and a plurality of values in the portion of the report. The error information including one or more error indications for erroneous values of the plurality of values in the portion of the report.

At 203, present, in the user interface, the preview of the report information, and one or more error indications for the erroneous values that are included in the preview. In some embodiments, the error information further includes an error count for the values in the portion of the report. The error count may be determined by counting errors and warnings generated for erroneous values in the portion of the report. In such embodiments, the method may also present, in the user interface, the error count along with the preview of the report information.

At 204, obtain a selection of a particular error indication of the one of more error indications. The particular error indication for a particular erroneous value in the preview.

At 205, navigate to a particular node within the hierarchy containing the particular erroneous value. In some embodiments, the navigation to the particular node within the hierarchy containing the particular erroneous value further includes recursively traversing the hierarchy starting from the particular node, to its parents, up to node selected within the hierarchy via the user interface.

At 206, retrieve the report information corresponding to the particular node. In some embodiments, the retrieval of the report information corresponding to the particular node further includes reading and rendering reporting information for each node that was traversed and rendering.

At 207, present, in the user interface, the report information corresponding to the particular node along with an identifier of the particular erroneous value.

In some embodiments, the method may also receive user input via the user interface, the user input modifying a value of a particular field to a modified value, determine error information for the particular field having the modified value, update the error count to an updated error count based on the error information for the particular field, and present the updated error count in the user interface.

In some embodiments the user interface includes an indication that the modified value has been modified by the user input.

In some embodiments the method may present a footer in the user interface. The footer contains a list of the erroneous values, where each erroneous value of the list in the footer is configured to be selectable by a user to navigate within the user interface to the corresponding node within the hierarchy.

EXAMPLE

Example implementations and algorithms for contextual navigation for errors and warnings are now given.

Figure 3:
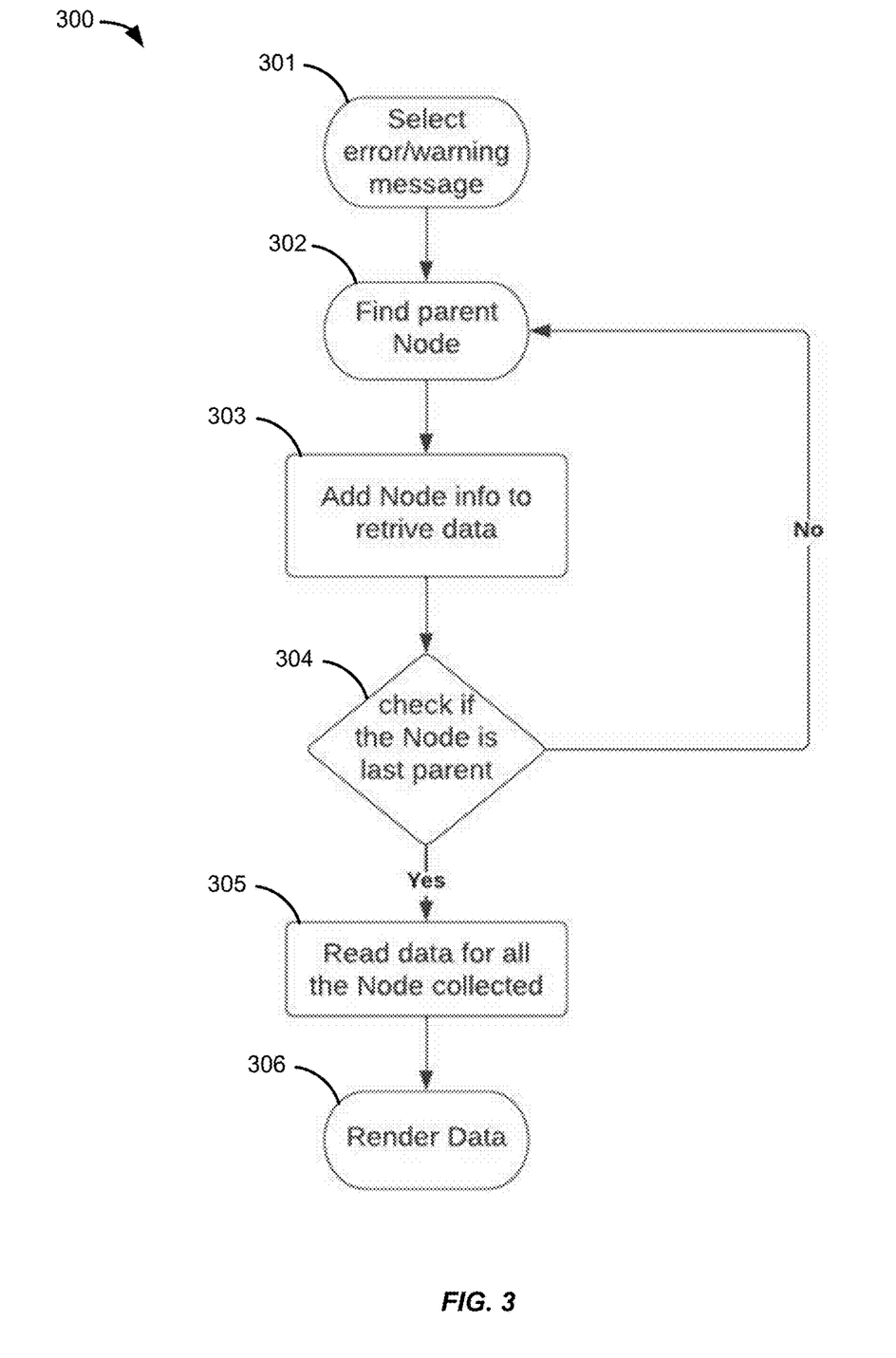
FIG. 3 shows a flowchart of contextual navigation including hierarchy traversal, according to an embodiment.
Figure 4:
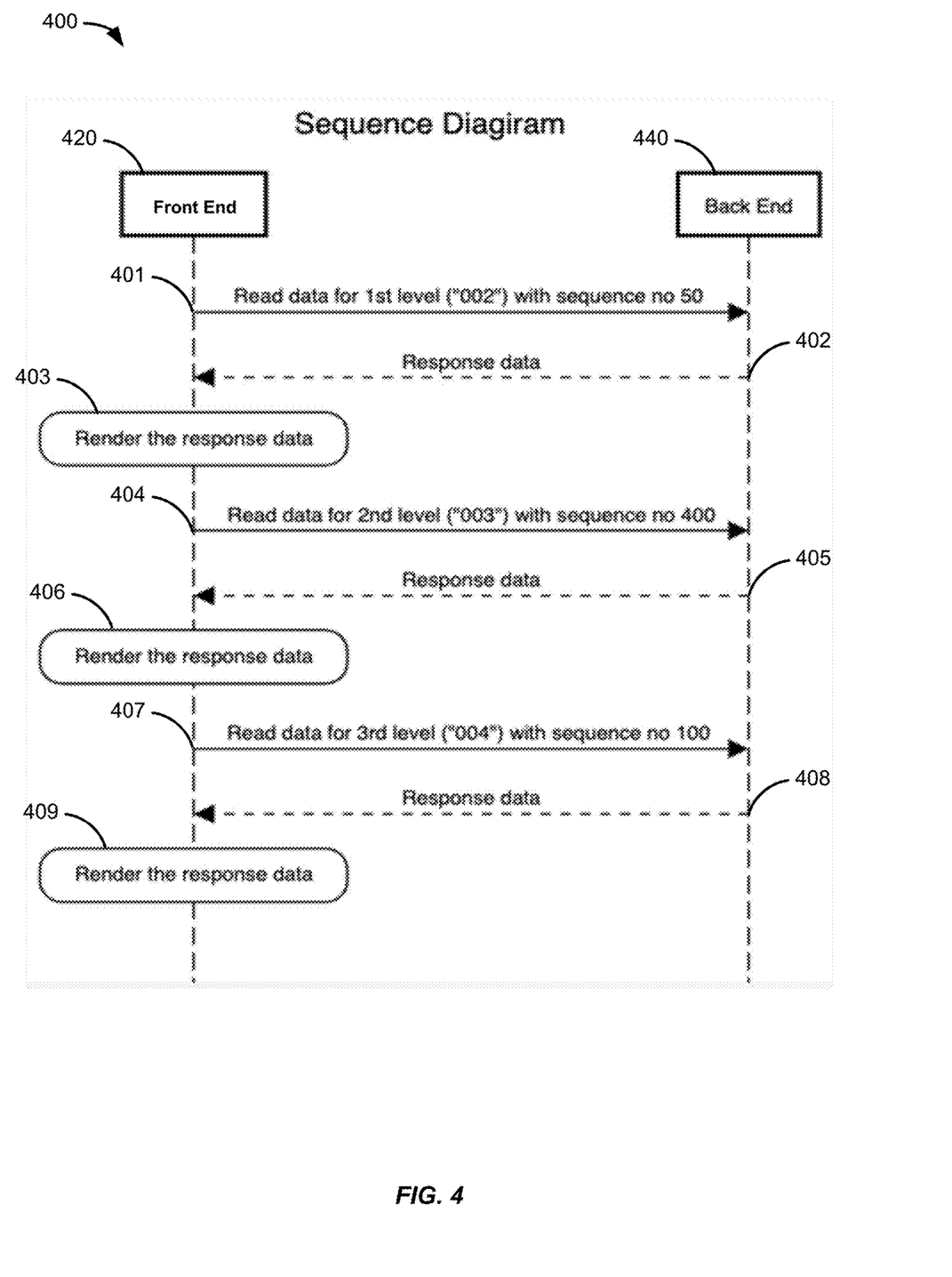
FIG. 4 shows a sequence diagram of reading and rendering hierarchical report data, according to an embodiment.

Referring back to the previous discussion, when a user selects a particular error/warning indication (e.g., in the preview or in the footer) the error may be for any field, and it can be at some nth level deep within the hierarchical structure (e.g., based on a schema provided by authorities to report to). On user selection of such indications (e.g., error messages), an algorithm is configured to recursively calculate the parent node details until the upper hierarchy node. Based on these parent element info respective data fetch will be triggered to display the errors/warnings entry and focus is set to a field corresponding to message that was clicked. The algorithm will not only display only errors/warnings field but all the intermediate parent nodes relative info as well. The algorithm is shown in FIG. 3. A sequence diagram for fetching and rendering the respective data is shown in FIG. 4.

FIG. 3 shows a flowchart 300 of contextual navigation including hierarchy traversal, according to an embodiment.

At 301, "Select error/warning message." That is, the user selects an error indication in the preview or footer area of the user interface. Using the same example mentioned above, a user may select the error message in the footer that states "Length of the value TAXITEM exceeds the max. perm . . . " (e.g., exceeds the maximum length permissible) as shown in FIG. 7.

Then, at 302, 303, and 304 the parent node details are recursively calculated until the upper hierarchy node. Specifically, at 302, "Find parent node." Then at 303, "Add Node info to retrieve data." And then at 304, "check if the Node is last parent." If the node is not the last parent ("No" at 304), the flowchart returns to 302 to find the parent node of this node. If the check at 304 is "Yes," then the flowchart continues to 305. FIG. 7 shows the lowest child node (_ITEM (3)) on the right side and the highest parent node (ROOT→ITEM (146)) on the left side.

At 305, "Read data for all the Node collected." Then, at 306, "Render Data." The reading of data at 305 and rendering of data at 306 are further described below with respect to FIG. 4.

An example of contextual navigation for a nested hierarchy is given below.

| "001" | Node Level | | | |
|---|---|---|---|---|
| | "002" | First Level | | |
| | | "003" | Second Level | |
| | | | "004" | Third Level. |

For example, as shown in the above table, there are three levels of nesting present in the schema provided by an authority and all the levels have tabular data the error/warning is present in the 3rd level ("004") 100th row nesting data. Upon click of the error/warning message from the footer log, the contextual navigation algorithm will recursively find the parent node information until it reaches the node level parent. In this example, algorithm will first find the 3rd level 100th row immediate parent details in this case it is 2nd level ("003") 400th row. Now algorithm will take 2nd level info as a starting point and find its immediate parent details in this case it is 1st level ("002") 50th row. Now algorithm will take 1st level info as a starting point and find its immediate parent in this case it is node level ("001").

Upon extracting all the level information, the computer system (e.g., front end) will make data calls (e.g., to the back end) based on the level element IDs and row information to show correct data in all the levels and to show exacted error/warning data. These data calls are described below with respect to FIG. 4.

FIG. 4 shows a sequence diagram 400 of reading and rendering hierarchical report data, according to an embodiment. This sequence diagram 400 is performed by a front end 420 (e.g., reporting application client 150 of FIG. 1) and a back end 440 (e.g., reporting application 120 of the computer system 110 of FIG. 1). This example sequence diagram builds on the table shown above and the example described with respect to FIG. 3.

At 401, the front end 420 reads for $1^{st}$ level ("002") with sequence no 50 from the back end 440. That is, the front end 420 reads row 50 of the $1^{st}$ level in the hierarchical reporting information.

At 402, the back end 440 sends response data to the front end 420. The response data includes the information in row 50 of the $1^{st}$ level in the hierarchical reporting information At 403, the front end 420 will render the response data. That is, the front end 420 presents the information for row 50 of the $1^{st}$ level in the user interface.

At 404, the front end 420 reads for $2^{nd}$ level ("003") with sequence no 400 from the back end 440. That is, the front end 420 reads row 400 of the 2nd level in the hierarchical reporting information.

At 405, the back end 440 sends response data to the front end 420. The response data includes the information in row 400 of the $2^{nd}$ level in the hierarchical reporting information At 406, the front end 420 will render the response data. That is, the front end 420 presents the information for row 400 of the $2^{nd}$ level in the user interface.

At 407, the front end 420 reads for 3rd level ("004") with sequence no 100 from the back end 440. That is, the front end 420 reads row 100 of the $3^{rd}$ level in the hierarchical reporting information.

At 408, the back end 440 sends response data to the front end 420. The response data includes the information in row 100 of the $3^{rd}$ level in the hierarchical reporting information.

At 409, the front end 420 will render the response data. That is, the front end 420 presents the information for row 100 of the $3^{rd}$ level in the user interface.

Accordingly, the front end 420 uses the level information extracted using the algorithm described above with respect to FIG. 3 to then read and render the data in the user interface.

Examples of the user interfaces for a reporting application client (such as the reporting application client 150 of FIG. 1) are given in FIG. 5, FIG. 6, and FIG. 7.

FIG. 5 illustrates a user interface 500 showing a hierarchy and a preview, according to an embodiment. In this example, the hierarchy includes a "ROOT" with 40 errors. ROOT has four children including "Group 1", which is selected, and "ITEM," "Choice1," and "Group2" which are not selected. Since "Group 1" is selected, a preview for Group 1 is shown in the Preview area of the user interface on the right side.

FIG. 6 illustrates a user interface 600 showing indications of erroneous values in a preview along with a footer having a list of errors, according to an embodiment. In this example, the hierarchy has 40 errors and the ROOT has three children, "ITEM," which is selected and has the 40 errors, and "Group 1" and "Group 2" which are not selected.

Since ITEM is selected, the preview area shows at least a portion of the fields and values for ITEM. A portion may be shown as the application may only load the data portions at a time (e.g., 400 rows of data at a time).

The user interface 600 also includes a footer with an error list which has been selected and is expanded as shown in FIG. 6. As mentioned above, the user may select error indications from this list in the footer or they may select error indications in the fields and values of the preview area.

FIG. 7 illustrates a user interface 700 showing a preview of a report information having an erroneous value and an indication of the erroneous value, according to an embodiments. The user interface 700 is similar to the user interface 600 when the user has made a selection (in the user interface 600) of the message 701 in the footer stating, "Length of the value TAX ITEM exceeds the max. perm . . . " and the computer system has contextually navigated to the portion of the report information containing this error (_ITEM (3)), as shown at 702.

Example Hardware

Figure 8:
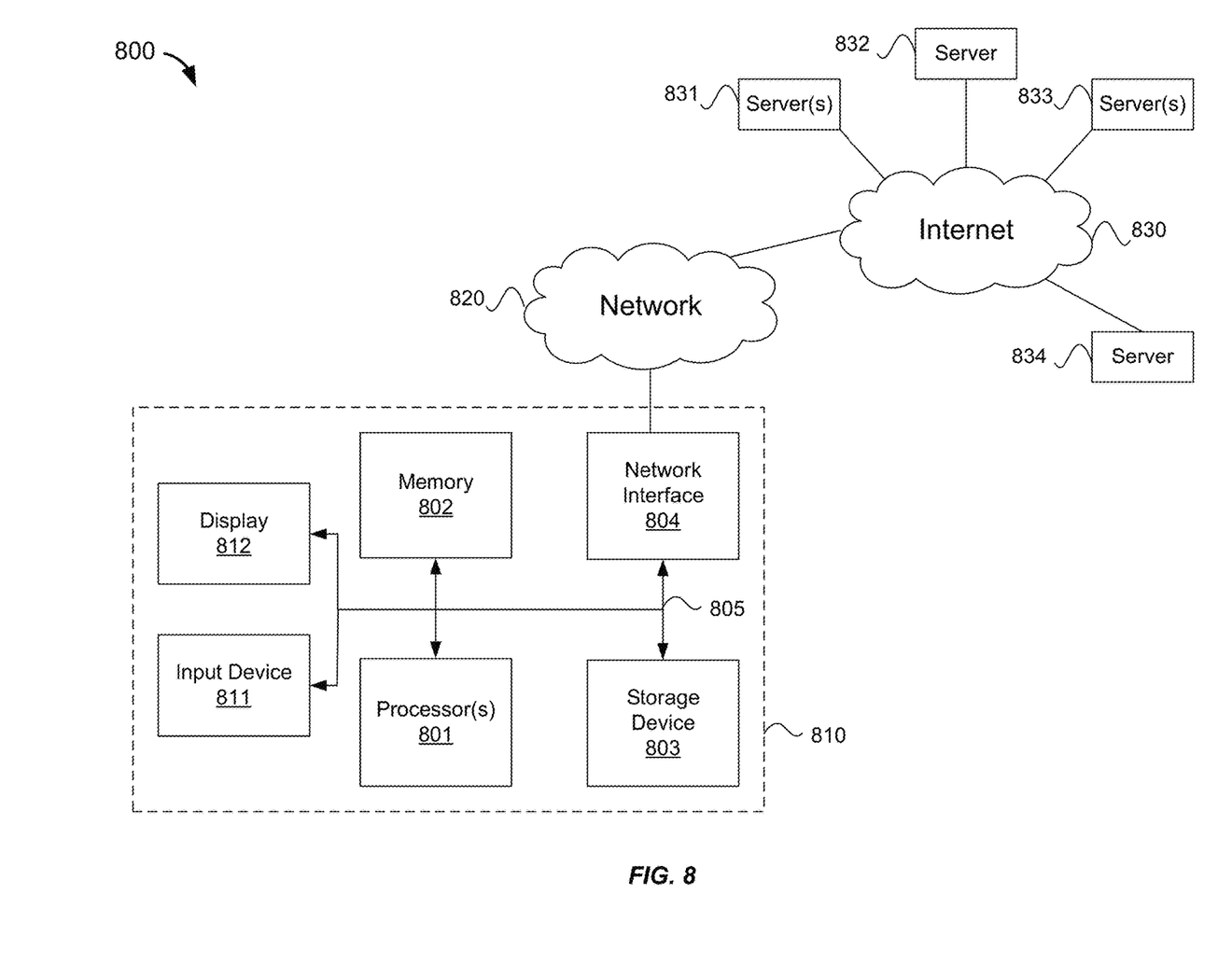
FIG. 8 shows a diagram of hardware of a special purpose computing machine for implementing systems and methods described herein.

FIG. 8 shows a diagram 800 of hardware of a special purpose computing machine for implementing systems and methods described herein. The following hardware description is merely one example. It is to be understood that a variety of computers topologies may be used to implement the above described techniques. For instance, the computer system may implement the computer implemented method described.

An example computer system 810 is illustrated in FIG. 8. Computer system 810 includes a bus 805 or other communication mechanism for communicating information, and one or more processor(s) 801 coupled with bus 805 for processing information. Computer system 810 also includes a memory 802 coupled to bus 805 for storing information and instructions to be executed by processor 801, including information and instructions for performing some of the techniques described above, for example. This memory 802 may also be used for storing programs executed by processor(s) 801. Possible implementations of this memory may be, but are not limited to, random access memory (RAM), read only memory (ROM), or both. As such, the memory 802 is a non-transitory computer readable storage medium.

A storage device 803 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 803 may include source code, binary code, or software files for performing the techniques above, for example. Storage device and memory are both examples of non-transitory computer readable storage mediums. For example, the storage device 803 may store computer program code including instructions for implementing the method described above with respect to FIG. 2.

Computer system 810 may be coupled using bus 805 to a display 812 for displaying information to a computer user. An input device 811 such as a keyboard, touchscreen, and/or mouse is coupled to bus 805 for communicating information and command selections from the user to processor 801. The combination of these components allows the user to communicate with the system. In some systems, bus 805 represents multiple specialized buses, for example.

Computer system also includes a network interface 804 coupled with bus 805. Network interface 804 may provide two-way data communication between computer system 810 and a network 820. The network interface 804 may be a wireless or wired connection, for example. Computer system 810 can send and receive information through the network interface 804 across a local area network, an Intranet, a cellular network, or the Internet, for example. In the Internet example, a browser, for example, may access data and features on backend systems that may reside on multiple different hardware servers 831, 832, 833, 834 across the network. The servers 831-834 may be part of a cloud computing environment, for example.

Additional Embodiments

Additional embodiments implementing the techniques described above are now described.

Some embodiments provide a computer system comprising one or more processors and one or more machine-readable medium coupled to the one or more processors. The machine-readable medium storing computer program code comprising sets of instructions executable by the one or more processors. The instructions executable to obtain a selection of a node within a hierarchy of nodes for a report via a user interface of a reporting application, the hierarchy corresponding to a hierarchical data structure of a data file containing report information for the report. The instructions further executable to obtain error information and at least a preview of report information for a portion of the report corresponding to the selection, the preview of the report information including a plurality of fields and a plurality of values in the portion of the report, the error information including one or more error indications for erroneous values of the plurality of values in the portion of the report. The instructions further executable to present, in the user interface, the preview of the report information, and one or more error indications for the erroneous values that are included in the preview. The instructions further executable to obtain a selection of a particular error indication of the one of more error indications, the particular error indication for a particular erroneous value in the preview. The instructions further executable to navigate to a particular node within the hierarchy containing the particular erroneous value. The instructions further executable to retrieve the report information corresponding to the particular node. And the instructions further executable to present, in the user interface, the report information corresponding to the particular node along with an identifier of the particular erroneous value.

In some embodiments, the error information further includes an error count for the values in the portion of the report, the error count determined by counting errors and warnings generated for erroneous values in the portion of the report. In some embodiments the computer program code further comprises sets of instructions executable by the one or more processors to present, in the user interface, the error count along with the preview of the report information.

In some embodiments, the computer program code further comprises sets of instructions executable by the one or more processors to receive user input via the user interface, the user input modifying a value of a particular field to a modified value, determine error information for the particular field having the modified value, update the error count to an updated error count based on the error information for the particular field, and present the updated error count in the user interface.

In some embodiments, the user interface includes an indication that the modified value has been modified by the user input.

In some embodiments, the computer program code further comprises sets of instructions executable by the one or more processors to present a footer in the user interface, the footer containing a list of the erroneous values, wherein each erroneous value of the list in the footer is configured to be selectable by a user to navigate within the user interface to the corresponding node within the hierarchy.

In some embodiments, the navigation to the particular node within the hierarchy containing the particular erroneous value further includes recursively traversing the hierarchy starting from the particular node, to its parents, up to node selected within the hierarchy via the user interface.

In some embodiments, the retrieval of the report information corresponding to the particular node further includes reading and rendering reporting information for each node that was traversed and rendering.

Some embodiments provide one or more non-transitory computer-readable medium storing computer program code comprising sets of instructions. The computer program code comprising sets of instructions to obtain a selection of a node within a hierarchy of nodes for a report via a user interface of a reporting application, the hierarchy corresponding to a hierarchical data structure of a data file containing report information for the report. The computer program code further comprising sets of instructions to obtain error information and at least a preview of report information for a portion of the report corresponding to the selection, the preview of the report information including a plurality of fields and a plurality of values in the portion of the report, the error information including one or more error indications for erroneous values of the plurality of values in the portion of the report. The computer program code further comprising sets of instructions to present, in the user interface, the preview of the report information, and one or more error indications for the erroneous values that are included in the preview. The computer program code further comprising sets of instructions to obtain a selection of a particular error indication of the one of more error indications, the particular error indication for a particular erroneous value in the preview. The computer program code further comprising sets of instructions to navigate to a particular node within the hierarchy containing the particular erroneous value. The computer program code further comprising sets of instructions to retrieve the report information corresponding to the particular node. The computer program code further comprising sets of instructions to present, in the user interface, the report information corresponding to the particular node along with an identifier of the particular erroneous value.

In some embodiments, the error information further includes an error count for the values in the portion of the report, the error count determined by counting errors and warnings generated for erroneous values in the portion of the report. In some embodiments, the computer program code further comprises sets of instructions executable by the one or more processors to present, in the user interface, the error count along with the preview of the report information.

In some embodiments, the computer program code further comprises sets of instructions to receive user input via the user interface, the user input modifying a value of a particular field to a modified value, determine error information for the particular field having the modified value, update the error count to an updated error count based on the error information for the particular field, present the updated error count in the user interface.

In some embodiments, the user interface includes an indication that the modified value has been modified by the user input.

In some embodiments, the computer program code further comprises sets of instructions to present a footer in the user interface, the footer containing a list of the erroneous values, wherein each erroneous value of the list in the footer is configured to be selectable by a user to navigate within the user interface to the corresponding node within the hierarchy.

In some embodiments, the navigation to the particular node within the hierarchy containing the particular erroneous value further includes recursively traversing the hierarchy starting from the particular node, to its parents, up to node selected within the hierarchy via the user interface.

In some embodiments, the retrieval of the report information corresponding to the particular node further includes reading and rendering reporting information for each node that was traversed and rendering.

Some embodiments provide a computer-implemented method. The method comprises obtaining a selection of a node within a hierarchy of nodes for a report via a user interface of a reporting application, the hierarchy corresponding to a hierarchical data structure of a data file containing report information for the report. The method further comprises obtaining error information and at least a preview of report information for a portion of the report corresponding to the selection, the preview of the report information including a plurality of fields and a plurality of values in the portion of the report, the error information including one or more error indications for erroneous values of the plurality of values in the portion of the report. The method further comprises presenting, in the user interface, the preview of the report information, and one or more error indications for the erroneous values that are included in the preview. The method further comprises obtaining a selection of a particular error indication of the one of more error indications, the particular error indication for a particular erroneous value in the preview. The method further comprises navigating to a particular node within the hierarchy containing the particular erroneous value. The method further comprises retrieving the report information corresponding to the particular node. The method further comprises presenting, in the user interface, the report information corresponding to the particular node along with an identifier of the particular erroneous value.

In some embodiments, the error information further includes an error count for the values in the portion of the report, the error count determined by counting errors and warnings generated for erroneous values in the portion of the report. In some embodiments, the method further comprises presenting, in the user interface, the error count along with the preview of the report information.

In some embodiments the method further comprises receiving user input via the user interface, the user input modifying a value of a particular field to a modified value, determining error information for the particular field having the modified value, updating the error count to an updated error count based on the error information for the particular field, and presenting the updated error count in the user interface.

In some embodiments, the user interface includes an indication that the modified value has been modified by the user input.

In some embodiments, the method further comprises presenting a footer in the user interface, the footer containing a list of the erroneous values, wherein each erroneous value of the list in the footer is configured to be selectable by a user to navigate within the user interface to the corresponding node within the hierarchy.

In some embodiments, the navigation to the particular node within the hierarchy containing the particular erroneous value further includes recursively traversing the hierarchy starting from the particular node, to its parents, up to node selected within the hierarchy via the user interface. In some embodiments, the retrieval of the report information corresponding to the particular node further includes reading and rendering reporting information for each node that was traversed and rendering.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
one or more processors; and
one or more machine-readable medium coupled to the one or more processors and storing computer program code comprising sets of instructions executable by the one or more processors to:
generate, for display in a user interface, a report as a hierarchy of nodes;
obtain a selection of a node within the hierarchy of nodes for a report via the user interface of a reporting application, the hierarchy corresponding to a hierarchical data structure of a data file containing report information for the report;
obtain (i) error information for a portion of the report corresponding to the selection and (ii) at least a preview of report information for the portion of the report corresponding to the selection, the preview of the report information including a plurality of fields and a plurality of values in the portion of the report, the error information including one or more error indications for erroneous values of the plurality of values in the portion of the report;
present, in the user interface, the preview of the report information, and one or more error indications for the erroneous values that are included in the preview;
obtain a selection of a particular error indication of the one of more error indications, the particular error indication for a particular erroneous value in the preview;
navigate to a particular node within the hierarchy containing the particular erroneous value;
retrieve the report information corresponding to the particular node; and
present, in the user interface, the report information corresponding to the particular node along with an identifier of the particular erroneous value.

2. The computer system of claim 1, wherein the error information further includes an error count for the values in the portion of the report, the error count determined by counting errors and warnings generated for erroneous values in the portion of the report, and wherein the computer program code further comprises sets of instructions executable by the one or more processors to:
present, in the user interface, the error count along with the preview of the report information.

3. The computer system of claim 2, wherein the computer program code further comprises sets of instructions executable by the one or more processors to:
receive user input via the user interface, the user input modifying a value of a particular field to a modified value;
determine error information for the particular field having the modified value;
update the error count to an updated error count based on the error information for the particular field; and
present the updated error count in the user interface.

4. The computer system of claim 3, wherein the user interface includes an indication that the modified value has been modified by the user input.

5. The computer system of claim 1, wherein the computer program code further comprises sets of instructions executable by the one or more processors to:
present a footer in the user interface, the footer containing a list of the erroneous values, wherein each erroneous value of the list in the footer is configured to be selectable by a user to navigate within the user interface to the corresponding node within the hierarchy.

6. The computer system of claim 1, wherein the navigation to the particular node within the hierarchy containing the particular erroneous value further includes recursively traversing the hierarchy starting from the particular node, to parents of the particular node, up to node selected within the hierarchy via the user interface.

7. The computer system of claim 6, wherein the retrieval of the report information corresponding to the particular node further includes reading and rendering reporting information for each node that was traversed and rendering.

8. One or more non-transitory computer-readable medium storing computer program code comprising sets of instructions to:
generate, for display in a user interface, a report as a hierarchy of nodes;
obtain a selection of a node within the hierarchy of nodes for a report via the user interface of a reporting application, the hierarchy corresponding to a hierarchical data structure of a data file containing report information for the report;
obtain (i) error information for a portion of the report corresponding to the selection and (ii) at least a preview of report information for the portion of the report corresponding to the selection, the preview of the report information including a plurality of fields and a plurality of values in the portion of the report, the error information including one or more error indications for erroneous values of the plurality of values in the portion of the report;
present, in the user interface, the preview of the report information, and one or more error indications for the erroneous values that are included in the preview;
obtain a selection of a particular error indication of the one of more error indications, the particular error indication for a particular erroneous value in the preview;
navigate to a particular node within the hierarchy containing the particular erroneous value;
retrieve the report information corresponding to the particular node; and present, in the user interface, the report information corresponding to the particular node along with an identifier of the particular erroneous value.

9. The non-transitory computer-readable medium of claim 8, wherein the error information further includes an error count for the values in the portion of the report, the error count determined by counting errors and warnings generated for erroneous values in the portion of the report, and wherein the computer program code further comprises sets of instructions executable by the one or more processors to:
present, in the user interface, the error count along with the preview of the report information.

10. The non-transitory computer-readable medium of claim 9, wherein the computer program code further comprises sets of instructions to:
receive user input via the user interface, the user input modifying a value of a particular field to a modified value;
determine error information for the particular field having the modified value;
update the error count to an updated error count based on the error information for the particular field; and
present the updated error count in the user interface.

11. The non-transitory computer-readable medium of claim 10, wherein the user interface includes an indication that the modified value has been modified by the user input.

12. The non-transitory computer-readable medium of claim 8, wherein the computer program code further comprises sets of instructions to:
present a footer in the user interface, the footer containing a list of the erroneous values, wherein each erroneous value of the list in the footer is configured to be selectable by a user to navigate within the user interface to the corresponding node within the hierarchy.

13. The non-transitory computer-readable medium of claim 8, wherein the navigation to the particular node within the hierarchy containing the particular erroneous value further includes recursively traversing the hierarchy starting from the particular node, to parents of the particular node, up to node selected within the hierarchy via the user interface.

14. The non-transitory computer-readable medium of claim 13, wherein the retrieval of the report information corresponding to the particular node further includes reading and rendering reporting information for each node that was traversed and rendering.

15. A computer-implemented method, comprising:
generating, for display in a user interface, a report as a hierarchy of nodes;
obtaining a selection of a node within the hierarchy of nodes for a report via the user interface of a reporting application, the hierarchy corresponding to a hierarchical data structure of a data file containing report information for the report;
obtaining (i) error information for a portion of the report corresponding to the selection and (ii) at least a preview of report information for the portion of the report corresponding to the selection, the preview of the report information including a plurality of fields and a plurality of values in the portion of the report, the error information including one or more error indications for erroneous values of the plurality of values in the portion of the report;
presenting, in the user interface, the preview of the report information, and one or more error indications for the erroneous values that are included in the preview;
obtaining a selection of a particular error indication of the one of more error indications, the particular error indication for a particular erroneous value in the preview;
navigating to a particular node within the hierarchy containing the particular erroneous value;
retrieving the report information corresponding to the particular node; and
presenting, in the user interface, the report information corresponding to the particular node along with an identifier of the particular erroneous value.

16. The computer-implemented method of claim 15, wherein the error information further includes an error count for the values in the portion of the report, the error count determined by counting errors and warnings generated for erroneous values in the portion of the report, and wherein the method further comprises
presenting, in the user interface, the error count along with the preview of the report information.

17. The computer-implemented method of claim 16, further comprising:
receiving user input via the user interface, the user input modifying a value of a particular field to a modified value;
determining error information for the particular field having the modified value;
updating the error count to an updated error count based on the error information for the particular field; and
presenting the updated error count in the user interface.

18. The computer-implemented method of claim 17, wherein the user interface includes an indication that the modified value has been modified by the user input.

19. The computer-implemented method of claim 15, further comprising:
presenting a footer in the user interface, the footer containing a list of the erroneous values, wherein each erroneous value of the list in the footer is configured to be selectable by a user to navigate within the user interface to the corresponding node within the hierarchy.

20. The computer-implemented method of claim 15, wherein the navigation to the particular node within the hierarchy containing the particular erroneous value further includes recursively traversing the hierarchy starting from the particular node, to parents of the particular node, up to node selected within the hierarchy via the user interface, and wherein the retrieval of the report information corresponding to the particular node further includes reading and rendering reporting information for each node that was traversed and rendering.

* * * * *